Nov. 16, 1926.
H. C. LORD
JOINT
Filed March 22, 1923
1,607,205
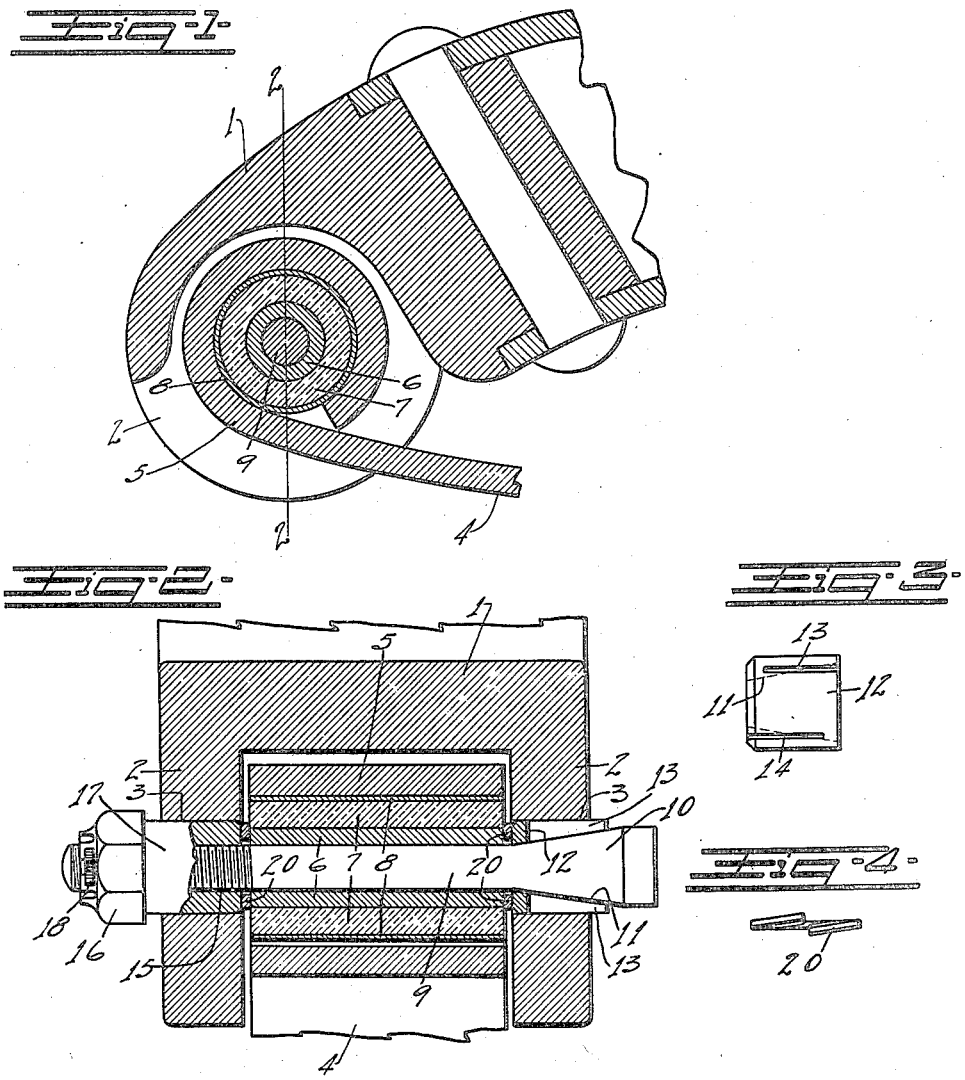

Patented Nov. 16, 1926.

1,607,205

UNITED STATES PATENT OFFICE.

HUGH C. LORD, OF ERIE, PENNSYLVANIA.

JOINT.

Application filed March 22, 1923. Serial No. 626,874.

This invention is designed to improve joints and is particularly advantageous in connection with the joints at the end of a spring directly connected to the frame of a vehicle although it is not limited to this use.

The invention is illustrated in the accompanying drawings as follows:—

Fig. 1 shows a central cross section through such a joint.

Fig. 2 a section on the line 2—2 in Fig. 1.

Fig. 3 a side elevation of an expanding sleeve used in the joint.

Fig. 4 a lock washer.

1 marks the frame bracket or mounting. This has the side walls 2 with the usual opposing openings 3. A spring 4 is provided with a spring eye 5 which is adapted to be arranged between the side walls. A joint is formed by a central joint sleeve 6, and a rubber joint element 7 bonded to the sleeve and to an outer shell 8. The shell is clamped in the spring eye by expanding it, inserting the shell and permitting the spring eye to close on the shell so that the shell is locked with the spring.

A joint pin 9 extends through the joint sleeve 6. It has a tapered end 10. An expanding sleeve 12 is mounted on the tapered end, the sleeve having a tapered opening 11 for receiving the end 10. The sleeve is provided with the slots 13 and 14 extending from the opposite ends of the sleeve so that the sleeve may be expanded under the action of the tapered end when the bolt is drawn endwise. The pin is screw-threaded at the opposite end 15 and a nut 16 is screwed on to this nut having the round portion 17 fitting the opening 3. The nut may be locked in place by a cotter pin 18 and lock washers 20 may be provided if desired.

It will be noted with this structure the expanding of the sleeve 12 locks the sleeve with the walls of the opening 3. It also locks the pin 10 against turning and the end of the joint sleeve 6 is clamped against the end of the sleeve 12 through the intervening lock washer. Thus the joint sleeve 6 is locked against turning. Not only is the joint sleeve locked against turning but inasmuch as the sleeve 12 is clamped in the opening 3 it is locked against axial movement and is thus capable of holding the spring eye free from the walls of the mounting. Inasmuch as with this joint no lubricant can be used this is an important feature. It will be noted that this joint may be placed in the ordinary openings of standard equipment without in any way changing them and thus adapts this joint to such equipment.

What I claim as new is:—

1. A joint comprising a joint sleeve; a pin through the sleeve having a tapered head; an expansible sleeve on the head expansible through the action of the head; a nut on the opposite end of the pin; a mounting with side walls with opposite openings through which the pin extends and with the walls of one of which the expansible sleeve is clamped; and a nut acting on the joint sleeve through the other opening to clamp the joint sleeve against the expansible sleeve.

2. A joint comprising a joint sleeve; a pin through the sleeve having a tapered head; an expansible sleeve on the head expansible through the action of the head; a nut on the opposite end of the pin; a mounting with side walls with opposite openings through which the pin extends and with the walls of one of which the expansible sleeve is clamped; and a nut extending through the other opening to exert pressure on the joint sleeve to clamp the same against the expansible sleeve.

3. A joint comprising a joint sleeve; a rubber joint element mounted on the sleeve; a joint member locked with the rubber joint element; a pin extending through the joint sleeve having a tapered head; an expansible sleeve on the head expansible through the action of the head; a nut on the opposite end of the pin; and a mounting with an opening in which the expansible sleeve is clamped through the action of the head.

4. A joint comprising a joint sleeve; a rubber joint element mounted on the sleeve; a joint member locked with the rubber joint element; a pin extending through the joint sleeve having a tapered head; an expansible sleeve on the head expansible through the action of the head; a nut on the opposite end of the pin; and a mounting having walls each side of the joint member with openings through which the pin extends, the expansible sleeve being clamped in one opening and the nut acting through the opposite opening.

5. In a joint, the combination of a bracket having opposing walls with openings therethrough; a spring eye arranged between said walls; a joint comprising a sleeve and a rubber joint element locked with the sleeve and with the spring eye; and means for locking the sleeve with the bracket comprising a pin extending through the sleeve having a tapered end; an expansible sleeve on the tapered end adapted to be expanded into an opening in one of the walls; and a nut at the opposite end of the pin acting against the joint sleeve through the opening.

In testimony whereof I have hereunto set my hand.

HUGH C. LORD.